United States Patent [19]

Paul

[11] 4,006,817
[45] Feb. 8, 1977

[54] CONVEYOR CHAIN

[75] Inventor: William T. Paul, Holyoke, Mass.

[73] Assignee: Incom International Inc., Pittsburgh, Pa.

[22] Filed: May 8, 1974

[21] Appl. No.: 467,969

Related U.S. Application Data

[63] Continuation of Ser. No. 269,898, July 7, 1972, abandoned.

[52] U.S. Cl. .............................................. 198/853
[51] Int. Cl.² ......................................... B65G 15/30
[58] Field of Search ................. 198/189, 193, 195; 85/8.8; 16/169, 168

[56] References Cited

UNITED STATES PATENTS 3,160,264  12/1964  Raybould ........................... 198/189
3,269,526  8/1966   Imse et al. .......................... 198/189

Primary Examiner—Evon C. Blunk
Assistant Examiner—Joseph E. Valenza
Attorney, Agent, or Firm—James C. Wray

[57] ABSTRACT

A conveyor chain comprising at least two pivotally connected links, each of said links comprising a flat body portion having a container carrying supporting face, two sets of at least two apertured ears projecting from an integral width of said flat body portion and on opposite sides thereof, said ears being spaced in side by side relation with respect to each other to interfit and align with the apertured ears of an adjoining link on the respective sides thereof, the apertures of said ears on each side of said flat body portion being in alignment, a grooved pin disposed in said aligned apertures of said interfitting ears, at least two of said ears being axially displaced to define an ear gap, said groove on said pin being in alignment with said ear gap, a holding ring means locked on said pin at said groove within said ear gap to hold said grooved pin within said aligned apertures and thereby holding said pivotally connected links in operational position.

10 Claims, 4 Drawing Figures

CONVEYOR CHAIN

This is a continuation of application Ser. No. 269,898, filed July 7, 1972, now abandoned.

This invention relates generally to conveyor chains and in particular to a conveyor chain adapted to carry and support containers.

Typically this type chain is characterized as a hinge top chain. This chain has been widely used in all types of automated, partially automated and non-automated processing and manufacturing plants where parts are moved from place to place in a rapid, ordered fashion. Such a chain might be used in an automotive manufacturing plant to move a part past successive work stations. It may be also typically used in a milk processing plant to move empty containers through various operational stations culminating in a filled container ready for market. As these type plants become more automated, hinge top chains will play a more and more important "conveying" role. Therefore, should the conveyor chain or any of its parts jam, buckle, break or otherwise malfunction, the entire automated or manufacturing line could be shut down resulting in a serious economic loss.

One serious defect in the prior art is the premature deterioration and ultimate breakage of the aperture ears used to interconnect adjoining links which could cause such a line shutdown. One approach in joining links is typified by U.S. Pat. No. 3,036,695 to Thuerman. The interconnecting pin used by Thuerman is provided with helical lands projecting from the portion of the periphery of the chain pin, the lands engaging complimentary helical grooves in the spaced ears or knuckles. The knurled pin pin typically tends to expand the ear or knuckle into which it is pressed causing stress cracking. This stress cracking, expansion and distortion of the ear or knuckle can result in the pin becoming dislodged from the ear aperture. Such dislocation of the pin will cause the chain to bind and/or become completely separated. Additionally, the stress cracking could result in the separation in whole or in part of the ear or knuckle from the main body of the chain link. This too could cause complete separation of the adjoining links.

Another typical prior art approach is found in U.S. Pat. No. 2,911,091 to Imse. Imse provides for integral yieldable chain pin-engaging projections extending inwardly from the peripheral surface of certain of the ear apertures. The projections are temporarily deformable by the pin as it is forced to its operative position in the aligning ear apertures. This approach could also result in expansion or distortion of the ears which could likewise cause stress cracking. This is particularly true in the case when the pin is partially skewed as it is passed through the ear. Such elongation or expansion will allow the pin to "walk out" of its operational position thereby causing separation of the adjoining links.

Accordingly, these as well as the other prior art forms of hinge top chains have been inefficient, ineffective and highly susceptible to premature failure.

SUMMARY OF THE INVENTION

It is therefore a primary object of the present invention to provide an efficient, effective hinge top chain having a long operational life.

It is another object of the present invention to provide a conveyor chain comprising at least two pivotally connected links, each of said links comprising a flat body portion having a container carrying supporting face, two sets of at least two apertured ears projecting from an integral width of said flat body portion and on opposite sides thereof, said ears being spaced in side by side relation with respect to each other to interfit and align with the apertured ears of an adjoining link on the respective sides thereof, the apertures of said ears on each side of said flat body portion being in alignment, a grooved pin disposed in said aligned apertures of said interfitting ears, at least two of said ears being axially displaced to define an ear gap, said groove on said pin being in alignment with said ear gap, a holding ring means locked on said pin at said groove within said ear gap to hold said grooved pin within said aligned apertures and thereby holding said pivotally connected links in operational position.

It is still another object of the present invention to provide a conveyor chain capable of being inexpensively manufactured, utilizing highly automated manufacturing techniques.

It is a further object of this invention to provide a conveyor type chain in which the respective links are positively locked together by mechanical means.

It is a still further object of this invention to provide a conveyor chain in which the adjoining links are joined together by use of a substantially C-shaped ring adapted to be mechanically interlocked at a groove on a chain pin.

One preferred embodiment is shown by figure examples in in the accompanying drawings and described in detail without attempting to show all the various forms and modifications in which the invention might be utilized, the invention being measured by the appended claims and not by the details of the specification.

DETAILS OF THE DRAWINGS

DESCRIPTION OF PREFERRED EMBODIMENTS

Figure 1:
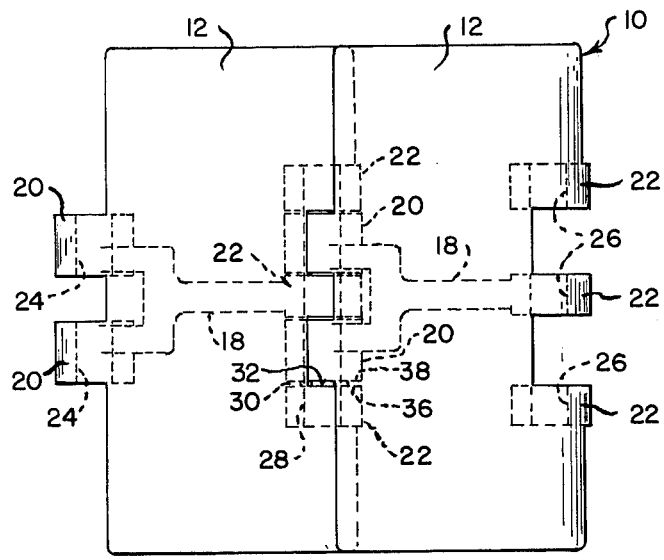
FIG. 1 is a bottom plan view of a section of chain constructed in accordance with the present invention.
Figure 2:
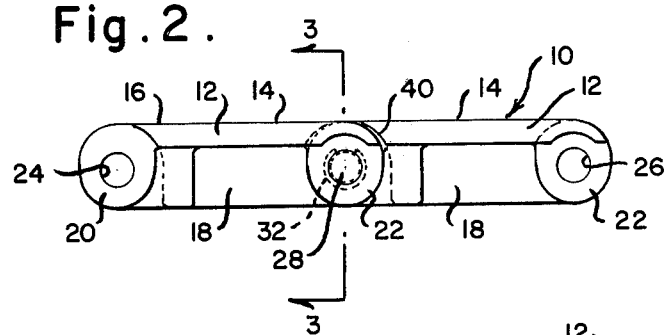
FIG. 2 is a side plan view of the section of the chain of FIG. 1.
Figure 3:
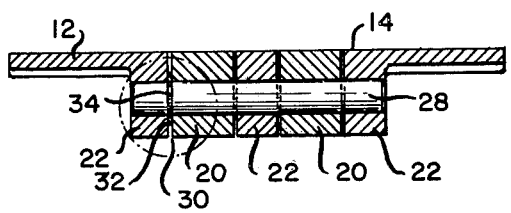
FIG. 3 is a sectional view taken along line 3—3 in FIG. 2.
Figure 4:
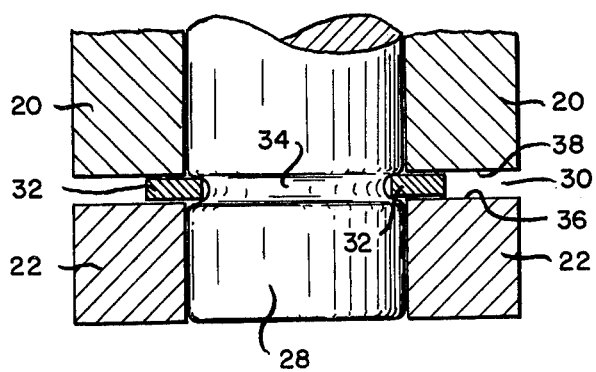
FIG. 4 is an expanded partial sectional view taken generally in the encircled area of FIG. 3.

Referring now particularly to the drawings, a section of conveyor chain embodying the concept of the present invention is designated generally by the numeral 10. The conveyor chain 10 is adapted to wrap around and operate over a cooperating sprocket (not shown).

The conveyor chain 10 comprises a number of identical links 12, each of these links includes a flat substantially rectangular body portion 14 having a planar-like face 16 upon which containers (not shown) can be supported and carried. The planar face 16 is on the upper body portion 14. A strengthening rib 18 may be provided on the opposite or bottom side of the body portion 14. The strengthening rib 18 could take various forms and need not be uniform in cross section.

The links 12 may be further provided with a set of two smoothly apertured ears 20 on one side of the link 12. The links 12 may also be provided with a set of three smoothly apertured ears 22 on the opposite side of the link 12. The strengthening rib may be formed integrally with both of the ears 20 and with one of the ears 22 preferably the centrally disposed ear.

The apertures or bores 24 and 26 of the respective ears 20 and 22 are all in alignment. The set of ears 20 interfit with the set of ears 22 to form a section of the chain 10 and the bores 24 and 26 of the interfitted ears are in such alignment as to receive a grooved chain pin 28. When the links 12 are in their interfitted and interconnected condition, they are adapted to articulate about the chain pin 28 and ride on and/or be driven by the aforementioned sprocket (not shown).

At least two of the interfitting ears 20 and 22 are axially displaced with respect to the chain pin 28 as to defining an ear gap 30. The groove 34 on the pin chain 28 is so positioned on the pin 28 as to be in alignment with the ear gap 30. The chain 10 may be further provided with a holding ring 32 which is adapted to be inserted into the ear gap 30 mechanically locked on the chain pin 28 at the groove 34 on said pin 28 within the ear gap 30 to hold the chain pin 28 within the aligned apertures of the interfitting ears 20 and 22. The holding ring 32 may be a substantially C shaped ring.

It should be noted that the inner surfaces of the apertures or bores 24 and 26 of the respective ears 20 and 22 define a smooth bearing surface for the smooth grooved chain pin 28. This results in a highly efficient articulating joint whose integrity is maintained by the positive locking action of the holding ring 32 upon the chain pin 28.

It should also be noted that replacement of a particular link is facilitated by the above described interlocking arrangement. A section of chain or any part thereof can easily be removed from the chain assembly by forcing the pin 28 axially with respect to the bores 24 and 26 of the interfitting ears 20 and 22. This action would cause the holding ring 32 to ride out of the groove 34 of the chain pin 28 thus mechanically disengaging the holding ring 32 from the chain pin 28, the axial position of the pin 28 being maintained by the lateral sidewalls 36 and 38 of the ears 20 and 22 respectively. The axial width of the holding ring 32 may be substantially equal to the width of the ear gap 30.

Obviously, assembly of the chain links 12 into a conveyor chain 10 or section thereof is also easily accomplished. In particular, assembly of the conveyor chain 10 in accordance with the present invention is highly susceptible to automated manufacturing procedures wherein the links 12 could be brought into relative alignment, the chain pin 28 could then be inserted in the aligned apertures 24 and 26 and the holding ring 32 could then be manipulated into the ear gap 30 and pressed or otherwise placed into a mechanical interlocking position with the chain pin 28 at its groove 34.

The flat body portion 14 of each link 12 has a grooved portion 40 whose arc has a substantially constant radii about the center of the chain pin 28. Therefore, the clearance between the adjoining links is maintained substantially constant thereby reducing the possibility of dirt or other foreign particles being lodged between said links.

The links 12 could be manufactured from a wide range and variety of materials. In its preferred form the link 12 could be manufactured from a plastic suitable for the particular environment in which it is to be used. The link 12 is simplistic in form and identical in shape and accordingly only one master die would be necessary for its manufacture. The chain pin 28 could also be manufactured from a wide range and variety of materials. In its preferred form, the chain pin 28 could be manufactured from stainless steel. Additionally, the pin could be coated to improve its bearing characteristics and/or its corrosion resistance characteristics.

The holding ring 32 could similarly be manufactured from a wide range and variety of materials. In its preferred form it might be manufactured from heat treated stainless steel and may be in a substantially C shaped form. Additionally, the inner surface of the holding ring 32 which interlocks and mates with the chain pin 28 may be beveled so as to further facilitate removal of the pin 28 from the bores 24 and 26 of the interfitting ears 20 and 22 respectively. This bevel could generally correspond to the arcurate surface of the groove 34 on the chain pin 28.

Obviously, the present invention is not limited to the specific details as herein described, but is capable of other modifications and changes without departing from the spirit and scope of the appended claims.

I claim:

1. A conveyor chain comprising at least two pivotally connected links, each of said links comprising a flat body portion having a container carrying supporting face, two sets of at least two apertured ears projecting from an integral width of said flat body portion and on opposite sides thereof, said ears being spaced in side by side relation with respect to each other to interfit and align with the apertured ears of an adjoining link on the respective sides thereof, the apertures of said ears on each side of said flat body portion being in alignment, a grooved pin disposed in said aligned apertures of said interfitting ears, at least two of said ears being axially displaced to define an ear gap, said groove on said pin being in alignment with said ear gap, a holding ring means locked on said pin at said groove within said ear gap to hold said grooved pin within said aligned apertures and thereby holding said pivotally connected links in operational position.

2. A conveyor chain in accordance with claim 1 wherein said holding ring means includes a substantially C-shaped ring adapted to be mechanically interlocked with said grooved pin at said groove.

3. A conveyor chain in accordance with claim 2 wherein said pin can be removed from said apertures by displacing it axially thereby forcing said substantially C ring out of said groove.

4. A conveyor chain in accordance with claim 3 wherein the width of said ring is substantially equal to the width of said ear gap.

5. A conveyor chain in accordance with claim 4 wherein said links are of a plastic material and said pin is a metal pin and said ring is expandible metal and is substantially C-shaped.

6. A conveyor chain in accordance with claim 5 wherein said body portion is provided with a strengthening rib on the side opposite said container carrying supporting face.

7. A conveyor chain in accordance with claim 6 wherein there are two ears on one side of said flat body portion and three ears on the opposite side thereof.

8. A conveyor chain in accordance with claim 7 wherein said flat body portion is substantially rectangular in shape.

9. A conveyor chain in accordance with claim 2 wherein radially extending lateral surfaces of said C-shaped ring abuts radially extending lateral faces of said ears that define said ear gap.

10. A conveyor chain in accordance with claim 1 wherein the inner surfaces of said aligned apertures define a highly efficient and smooth bearing surface for said pin.

* * * * *